United States Patent [19]

Kercheval et al.

[11] Patent Number: 4,655,804
[45] Date of Patent: Apr. 7, 1987

[54] HOPPER GAS DISTRIBUTION SYSTEM

[75] Inventors: Mark R. Kercheval, Hanover; Lawrence W. Fickus, Baltimore, both of Md.

[73] Assignee: Environmental Elements Corp., Baltimore, Md.

[21] Appl. No.: 807,700

[22] Filed: Dec. 11, 1985

[51] Int. Cl.$^4$ ............................................. B01D 50/00
[52] U.S. Cl. ........................................ 55/324; 55/334; 55/341 R; 55/418; 55/426
[58] Field of Search .................. 55/324, 334, 335, 332, 55/341 R, 341 NT, 418, 425, 426, 424, 428, 128, 129

[56] References Cited

U.S. PATENT DOCUMENTS

| | | | |
|---|---|---|---|
| 1,632,895 | 6/1927 | Hagelthorn | 55/341 NT X |
| 1,820,026 | 8/1931 | Kuenhold | 55/418 X |
| 3,739,557 | 6/1973 | Anderson et al. | 55/341 R X |
| 3,831,350 | 8/1974 | Gilles et al. | 55/418 X |
| 3,926,595 | 12/1975 | Bockman | 55/341 R X |
| 3,992,177 | 11/1976 | Welteroth | 55/341 NT X |
| 4,158,554 | 6/1979 | Bundy et al. | 55/341 R X |

Primary Examiner—Kathleen J. Prunner
Attorney, Agent, or Firm—Morton J. Rosenberg

[57] ABSTRACT

A hopper gas distribution system (10) is provided for dispersing particulate laden gas in an equal flow rate around or into a plurality of filter bags (16) maintained in a bag house above a hopper housing (12). Particulate laden gas enters the hopper housing (12) through an inlet conduit (18) and is directed in an upward vertical direction (24) by a plurality of turning vane members (30) mounted within the hopper housing (12) in a longitudinally displaced as well as vertically displaced manner, each with respect to the other. Below the turning vane members (30) and the inlet conduit (20) is mounted a plurality of blocking vane members (42) secured to opposing transverse sidewalls (32 and 34) of hopper housing (12). The blocking vane members (42) create a false bottom floor which further impedes particulate laden gas from passing down into a lower section of the hopper housing (12). In this manner, the particulate laden gas is driven upwardly around or into the filter bags (16) in a uniform manner throughout the cross-sectional interior area of the baghouse (14).

19 Claims, 3 Drawing Figures

HOPPER GAS DISTRIBUTION SYSTEM

BACKGROUND OF THE INVENTION

1. Field of the Invention

This invention pertains to filtering systems. In particular, this invention relates to filtering systems utilizing filter bags to filter particulate matter in a particulate laden gas. More in particular, this invention relates to a filtering system where particulate laden gas is driven around or into a plurality of filter bags in a uniform manner such that all of the filter bags are exposed to a substantially constant flow rate of incoming particulate laden gas. Still further, this invention pertains to a filtering system utilizing a hopper gas distribution system having turning vane members which redirect the incoming particulate laden gas into the neighborhood of a plurality of filter bags. Additionally, this invention relates to a hopper gas distribution system which utilizes a series of blocking vane members mounted below a plurality of turning vane members to create a false bottom to a hopper housing as seen from the incoming particulate laden gas and to direct such particulate laden gas in a unitary direction.

2. Prior Art

Filtering systems utilizing a lower hopper housing and a baghouse having filter bags for filtering particulates from a gas are well-known in the art. However, in prior art systems, it has been found that the particulate laden gas driven into the neighborhood of the filter bags is not uniform in flow rate. Additionally, extreme velocities of the particulate laden gas have caused erosion of both the structural materials making up the baghouse and the hopper housing, as well as the filter bags.

The closest prior art known to Applicant includes U.S. Pat. Nos. 3,480,330; 3,926,595; 4,227,903; 3,897,721; 3,739,557; 3,608,278; 3,831,350; 3,853,750; 4,213,766; 4,360,432; 3,409,131; and, 4,452,617.

Some of such prior art systems are concerned with the distribution of incoming particulate laden gas, however, such do not direct themselves to the combination of elements which allow for the turning of the gaseous material while providing a high pressure area in the form of a false floor, as is shown in the subject invention concept.

U.S. Pat. No. 3,480,330 is directed to a dust collector of the baghouse type system. The dust collector of this reference provides for a housing including a plurality of filter tubes or bags. A multiplicity of baffles are provided in the housing in order to distribute the incoming air in a uniform manner to the filtering state, however, such does not provide for the same type of distribution vanes as provided in the invention concept system.

U.S. Pat. No. 3,926,595 directs itself to a dust filter system wherein a number of guide vanes are arranged to conduct and distribute the gas flow in its displacement path into the filter chamber. The filter chamber does include a plurality of filter bags however, although this does show vanes for distributing air, it does not provide for the combination of the redirecting flow mechanism and the blocking flow mechanism as provided in the subject invention.

U.S. Pat. No. 4,227,903 is directed to a filter cell system including a dust chamber having a plurality of filter cells mounted therein. This reference includes a grating having baffles inclined in an upward manner to direct the incoming air within the dust chamber. The baffles are believed to be rotatably displaceable however, as in the previous references, such does not provide for the combination of the blocking and redirecting vane members of the subject invention system.

SUMMARY OF THE INVENTION

A hopper gas distribution system for passing particulate laden gas around or into a plurality of filter bags located in a baghouse includes a hopper housing which is in fluid communication with the filter bags. An inlet conduit for supplying the particulate laden gas into the hopper housing in a longitudinal direction is further provided. The hopper gas distribution system includes a mechanism for redirecting the flow of the supplied particulate laden gas in the first direction around into the plurality of filter bags and a mechanism for blocking the flow of the particulate laden gas in a second direction within the hopper housing driving the gas in the first direction.

DESCRIPTION OF THE PREFERRED EMBODIMENTS

Figure 1:
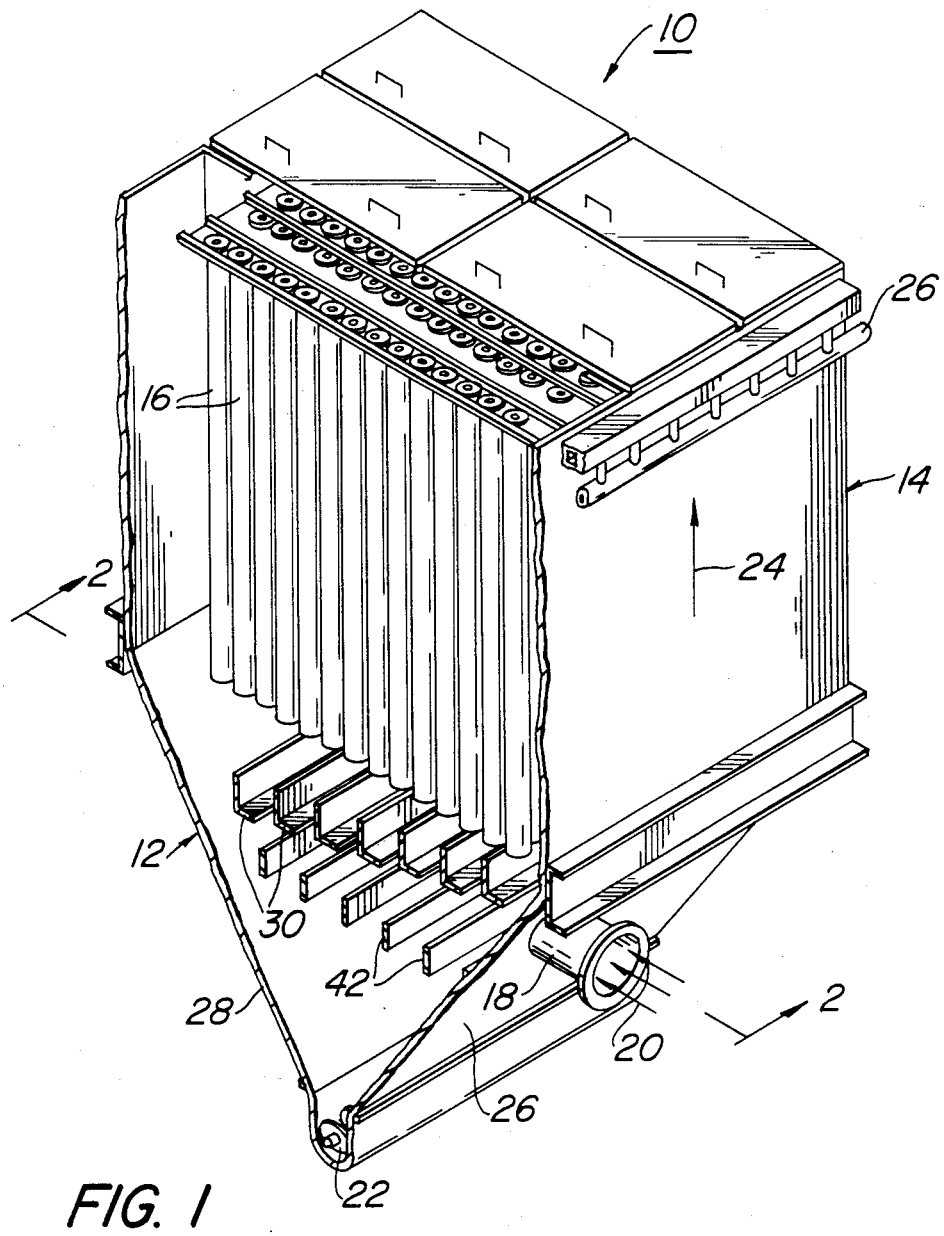
FIG. 1 is a perspective view partially in cut-away of the hopper gas distribution system.
Figure 2:
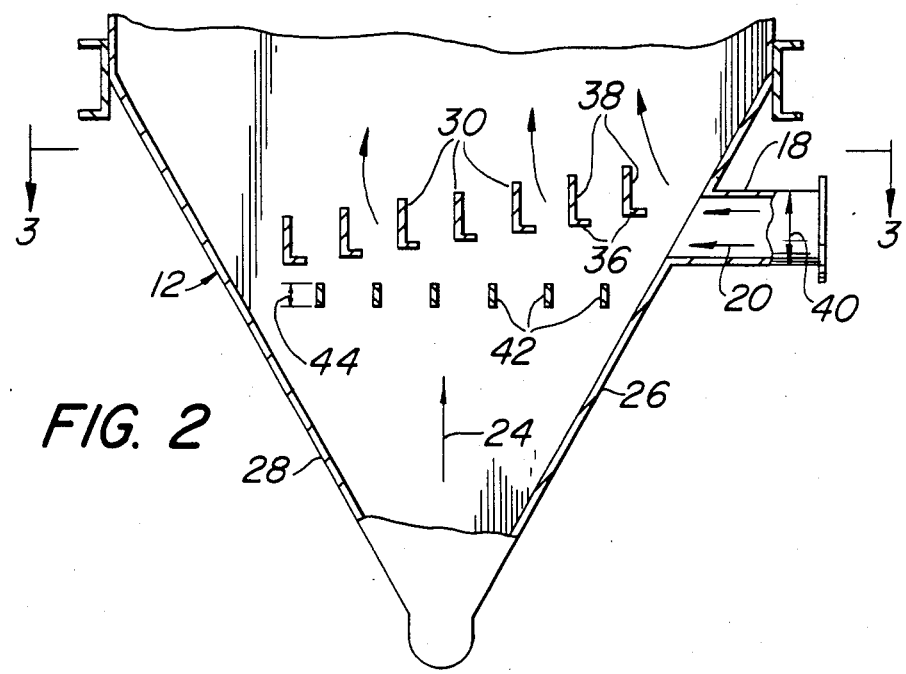
FIG. 2 is an elevational view of a portion of the hopper housing of the hopper gas distribution system in section taken along the Section Lines 2—2 of FIG. 1; and, FIG. 3 is a sectional view of the hopper housing taken along the Section Line 3—3 of FIG. 2.
Figure 3:
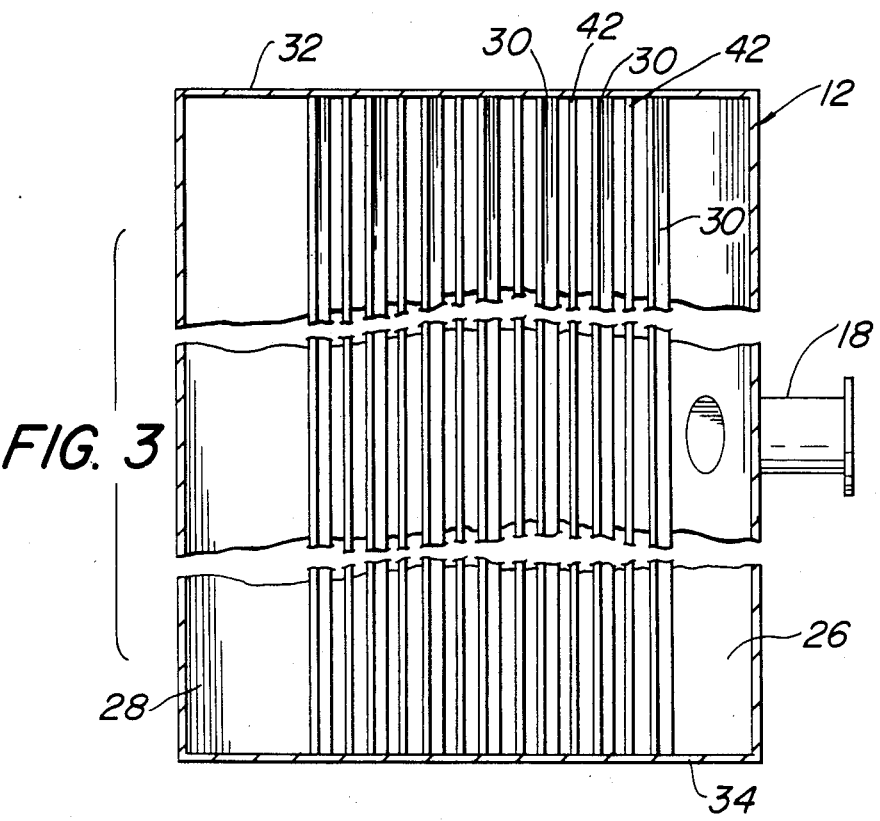

Referring now to FIGS. 1-3, there is shown hopper gas distribution system 10 for equalizing flow rates of particulate laden gas around or into filter bags 16 maintained in baghouse 14 above hopper housing 12. In overall concept, particulate laden gas enters hopper housing 12 in longitudinal direction 20 through inlet conduit 18. Discharge mechanism 22 may be a screw type impeller mechanism not important to the inventive concept as herein described, with the exception that whatever discharge mechanism 22 is being used, such will accommodate the egress of particulate matter falling to the lower portions of hopper housing 12.

The particulate laden gas which is directed in vertical direction 24 is driven in an upward manner around or into filter bags 16 where particles are deposited on the exterior or interior surfaces of filter bags 16 dependent on the method of filtering. The cleansed gas passes through the walls of filter bags 16 and is driven to outlet manifold 26, as shown in FIG. 1 for removal from the entire system or for recirculation purposes. Prior to the development of hopper gas distribution system 10, particulate laden gas entering in longitudinal direction 20 through inlet conduit 18 had a tendency of impinging on hopper inclined sidewall 28. When the particulate laden gas impinged on hopper inclined sidewall 28, such had a tendency of being driven upward in vertical direction 24 and downward into the lower portion of hopper housing 12. As the particulate laden gas was driven downward in hopper housing 12, due to the inclined nature of sidewalls 26 and 28, the particulate laden gas experienced a decrease in cross-sectional area which increased the velocity of the particulate laden gas. The gas finally experienced a boundary and was then driven upwardly in vertical direction 24 towards filter bags 16. Unfortunately, measurements have shown that the velocity flow subsequent to impingement on the inclined sidewalls 26 and 28 resulted in gas flows which were approximately twice the velocity of the incoming particulate laden gas through inlet conduit 18.

The increased velocity in combination with the ash particulates provided an eroding effect on both the structures of the baghouse 14, and the hopper housing 12. Further, the eroding effect was manifest on filter bags 16. It has been found that filter bags 16 on the periphery of the plurality of filter bags 16 contained in baghouse 14 eroded at a rapid rate. In opposition, filter bags 16 in the central portion of baghouse 14 did not experience the rapid erosion effect.

Measurements taken in actual systems have shown that for particulate laden gas supplied through inlet conduit 18 in the range of 40-60 feet per second resulted in velocities of flow around peripheral filter bags 16 in the neighborhood of up to 90.0 feet per second, whereas velocity flow around centrally located filter bags 16 had velocities as low as 10.0 feet per second. In many instances, peripheral filter bags 16 had to be replaced on the order of every six months while centrally located filter bags 16 were operational for over two years. This increased maintenance and variation of filter bag life created extreme increased maintenance costs for this type of collector system.

The object of hopper gas distribution system 10 is to provide a relatively constant upward gas flow velocity throughout a horizontal cross-sectional area of baghouse 14. In this manner, all filter bags 16 mounted in baghouse 14 are operationally used in generally the same manner and there is provided an equalization of filtering effect among all filter bags 16.

Hopper gas distribution system 10 passes particulate laden gas around or into the plurality of filter bags 16 located in baghouse 14 and includes hopper housing 12 having inclined sidewalls 26 and 28 as is shown in FIGS. 1-3. Inlet conduit 18 provides for supplying particulate laden gas into hopper housing 12 in longitudinal direction 20. Gas distribution system 10 directs or turns inlet particulate laden gas in a first direction upwardly in vertical direction 24. As shown in the Figures, there is provided a mechanism for redirecting the flow of the supplied particulate laden gas in upward vertical direction 24 around the plurality of filter bags 16.

The redirection mechanism is provided by a plurality of turning vane members 30 coupled on opposing ends thereof to opposing transversely displaced sidewalls 32 and 34 of hopper housing 12. Turning vane members 30 are longitudinally displaced each from the other in longitudinal direction 20 and as can be seen in FIG. 2, are also displaced each from the other in vertical direction 24. Turning vane members 30 may be fixedly secured to opposing transversely displaced sidewalls 32 and 34 by welding, bolting, or some like technique, not important to the inventive concept as herein described.

Turning vane members 30 are substantially L-shaped in contour, having leading leg members 36 extending substantially in longitudinal direction 20 and trailing leg members 38 extending in first direction or upward vertical direction 24. In this manner, gas being supplied through inlet conduit 18 passes adjacent to leading leg members 36 of turning vane members 30 and substantially impinges against trailing leg members 38 wherein such particulate laden gas is driven upward toward filter bags 16.

Inlet conduit 18 is shown in the embodiments provided in FIGS. 1-3 as having a generally circular cross-sectional area when taken with respect to longitudinal direction 20. It is to be understood that the cross-sectional area of inlet conduit 20 may be rectangular or have other polygonal contours. The longitudinal displacement of each of turning vane members 30 with respect to a consecutively longitudinally mounted vane member 30 is generally formulated by the approximate inlet conduit height 40 divided by the number of turning vane members 30 utilized in hopper gas distribution system 10. Thus, approximately an equal amount of particulate laden gas entering through inlet conduit 18 strikes each of turning vane members 30.

Additionally, leading leg members 36 have been found to be extremely useful in the range of between 1.0–2.0 inches in the extended longitudinal direction 20. The particular longitudinal length of leading leg members 36 have not been found to be critical to the equalization of gas distribution around filter bags 16, however, such do provide for a partial blocking effect of directing the gases in an upward manner, instead of in a downward vertical direction.

Trailing leg members 38 of turning vane members 30 which extend in first or upward vertical direction 24 have a direction length in accordance with the approximating formula:

$$(1.1)\frac{H_I}{(N_v + 1)} \leq b \leq (1.4)\frac{H_I}{(N_v + 1)}$$

where:
$H_I$ = Height of inlet conduit in first direction (in.)
$N_v$ = Number of turning vane members in said hopper housing
b = Turning vane member trailing leg dimension in first direction (in.)

Surprisingly, it has been found that with only the use of turning vane members 30 in hopper gas distribution system 10, that there is still a considerable amount of particulate laden gas which is driven toward the bottom of hopper housing 12 in a direction opposing upward vertical direction 24. It is hypothesized that the incoming particulate laden gas seeks the path of least resistance and in some cases, due to a lower pressure in the lower section of hopper housing 12, such gases are driven in a downward direction. In order to block the flow of incoming particulate laden gases in a downward vertical direction, while maintaining an opening to allow for particulate to fall to the bottom of hopper housing 12, a mechanism for blocking the flow of the particulate laden gas in a second direction or downward vertical direction within hopper housing 12 has been developed and incorporated into system 10, as is clearly seen in FIGS. 1 and 2. The blocking mechanism includes a plurality of blocking vane members 42 coupled on opposing ends thereof to opposing transversely displaced sidewalls 32 and 34 of hopper housing 12. Blocking vane members 42 are positionally located below the plurality of turning vane members 30 and extend substantially parallel to the extension of turning vane members 30, as is seen in FIGS. 1-3. Each of blocking vane members 42 are displaced each from the other in longitudinal direction 20 and form a substantially horizontal planar envelope. Blocking vane members 42 are positionally located in longitudinal direction 20 in an interspersed manner between turning vane members 30 and are generally located approximately one-half the longitudinal displacement dimension between successive turning vane members 30.

The concept of utilizing blocking vane members 42 in combination with turning vane members 30 is to provide a false bottom floor section while simultaneously allowing particulate to be driven to the lower portion of hopper housing 12 by gravity assist. It is believed that the blocking vane members 42 in their positional location create a higher pressure, thus increasing flow resistance in this area of hopper housing 12. Thus, incoming particulate laden gas will be driven in upward vertical direction 24.

Each of blocking vane members 42 are substantially planar in contour and are generally vertically directed, as is shown in FIGS. 1 and 2. Additionally, it has been found by experimental processes that the blocking vane member height 44 in vertical direction 24 is advantageous in the approximating range:

$$0.4(b) \leqq H_{BV} \leqq 0.75(b)$$

where:

b=Turning vane member trailing leg dimension in first direction (in.)

$H_{BV}$=Height of blocking vane member in first direction (in.)

Thus, it has been found that the height of blocking vane members 42 is advantageously a function of the height of the trailing leg members 38 of turning vane members 30. Additionally, although not critical to the invention concept as herein defined, blocking vane members 42 are located below the lowermost turning vane member 30 mounted in hopper housing 12 within a few feet of the corresponding lowermost leading leg member 36. Obviously, of extreme importance, is the fact that blocking vane members 42 are positionally located within hopper housing 12 in an area which is lower than the lowermost portion of inlet conduit 18.

Hopper gas distribution system 10 as herein described is adaptable for use in a wide range of filtering systems. System 10 may be used with a pulse jet type fabric filter as well as with reverse air type filters where collection and gas flow are into filter bags 16 as opposed to particulate laden gas flow passing around bags 16.

Although this invention has been described in connection with specific forms and embodiments thereof, it will be appreciated that various modifications other than those discussed above may be resorted to without departing from the spirit or scope of the invention as defined in the appended Claims. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. In a baghouse having a plurality of filter bags disposed therein, the improvement comprising a hopper gas distribution system for passing particulate laden gas around or into said filter bags and comprising:

(a) a hopper housing coupled to said baghouse and in fluid communication with said filter bags;

(b) an inlet conduit coupled to said hopper housing for supplying said particulate laden gas into said hopper housing in a longitudinal direction;

(c) means within said hopper housing and adjacent said inlet conduit for redirecting flow of said supplied particulate laden gas in a first direction around or into said plurality of filter bags; and, (d) means for blocking flow of said particulate laden gas in a second direction within said hopper housing, said means for blocking flow being located below said inlet conduit and said means for redirecting flow of said supplied particulate laden gas.

2. The baghouse as recited in claim 1 wherein said first direction is substantially normal said longitudinal direction of said supplied particulate laden gas.

3. The baghouse as recited in claim 1 where said second direction is substantially 180° out of phase with respect to said first direction.

4. The baghouse as recited in claim 1 where said means for redirecting said flow of said particulate laden gas is coupled to opposing sidewalls of said hopper housing.

5. The baghouse as recited in claim 1 where said means for redirecting said flow of said particulate laden gas includes a plurality of turning vane members coupled on opposing ends thereof to opposing transversely displaced sidewalls of said hopper housing.

6. The baghouse as recited in claim 5 where said plurality of said turning vane members are displaced each from the other in said longitudial direction and said first direction.

7. The baghouse as recited in claim 6 where said first direction is a vertical direction, said filter bags extending above said plurality of said vane members.

8. The baghouse as recited in claim 6 where each of said turning vane members is fixedly secured to said hopper housing transversely displaced sidewalls.

9. The baghouse as recited in claim 6 where each of said turning vane members is substantially L-shaped in contour having a leading leg member extending substantially in said longitudinal direction and a trailing leg member extending substantially in said first direction.

10. The baghouse as recited in claim 9 where said trailing leg member extending in said first direction of each of said turning vane members has a first direction length in accordance with the approximating formula:

$$(1.1)\frac{H_I}{(N_v + 1)} \leqq b \leqq (1.4)\frac{H_I}{(N_v + 1)}$$

where:

$H_I$=Height of inlet conduit in first direction (in.)

$N_v$=Number of turning vane members in said hopper housing b=Turning vane member trailing leg dimension in first direction (in.).

11. The baghouse as recited in claim 10 where said leading leg member extending in said longitudinal direction of each of said turning vane members includes a dimensional length between approximately 1.0 to 2.0 inches.

12. The baghouse as recited in claim 11 where succeeding leading leg members of consecutively spaced vane members are displaced each from the other in said first direction by an amount approximating said height of said inlet conduit in said first direction divided by said number of vane members in said hopper housing.

13. The baghouse as recited in claim 10 where said means for blocking flow of said particulate laden gas in said second direction includes a plurality of blocking vane members coupled on opposing ends thereof to opposing transversely displaced sidewalls of said hopper housing.

14. The baghouse as recited in claim 13 where said blocking vane members extend substantially parallel a transverse extension of said turning vane members.

15. The baghouse as recited in claim 14 where said plurality of blocking vane members are displaced each from the other in said longitudinal direction.

16. The baghouse as recited in claim 15 where said plurality of blocking vane members forms a substantially horizontal planar envelope.

17. The baghouse as recited in claim 16 where said blocking vane members are substantially planar in contour.

18. The baghouse as recited in claim 17 where said blocking vane members are interspersed between consecutively longitudinally displaced turning vane members.

19. The baghouse as recited in claim 17 where said planar contour blocking vane members have a height in said first direction approximating:

$$0.4(b) \leq H_{BV} \leq 0.75(b)$$

where:
- $b$ = Turning vane member trailing leg dimension in first direction (in.)
- $H_{BV}$ = Height of blocking vane member in first direction (in.).

* * * * *